(Model.)
G. ELLSWORTH.
BEE HIVE.
No. 263,154.　　　　　　　　　　Patented Aug. 22, 1882.
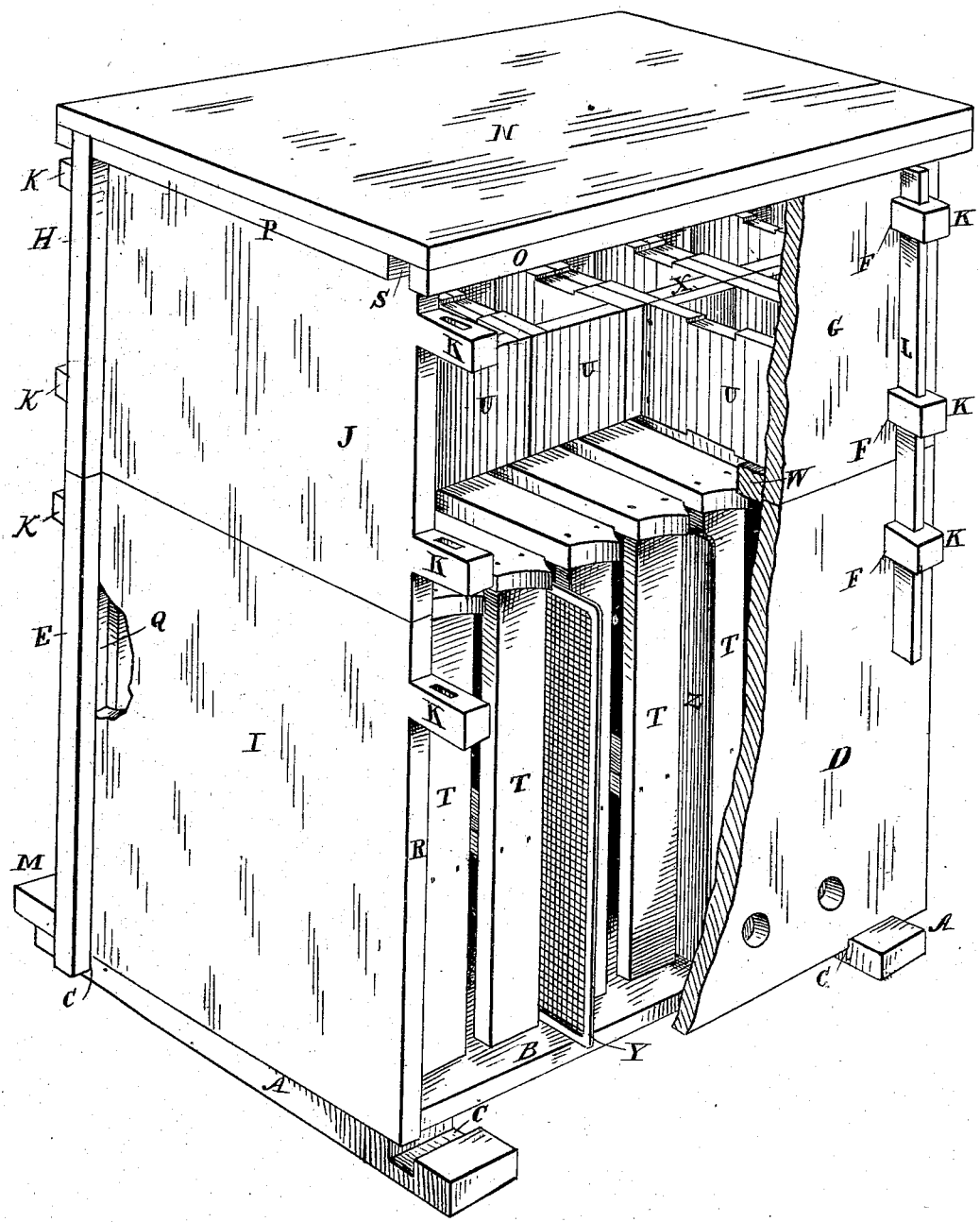
WITNESSES:　　　　　　　　　　INVENTOR:

UNITED STATES PATENT OFFICE.

GEORGE ELLSWORTH, OF BOWLING GREEN, OHIO.

BEE-HIVE.

SPECIFICATION forming part of Letters Patent No. 263,154, dated August 22, 1882.

Application filed May 3, 1882. (Model.)

*To all whom it may concern:*

Be it known that I, GEORGE ELLSWORTH, of Bowling Green, in the county of Wood and State of Ohio, have invented a new and Improved Bee-Hive, of which the following is a full, clear, and exact description.

My invention relates to improvements in beehives; and it consists in the peculiar construction and arrangement of parts, as hereinafter more fully set forth.

Reference is to be had to the accompanying drawing, which is a perspective view of a hive constructed according to my improvement with a part of the front of the case removed.

A represents a couple of sills, to which the bottom B is nailed, said sills having gains C across the upper face along and parallel with the edges of bottom B, to receive the lower edges of the lower sections, D E, of the front and back sides of the case or shell of the hive. The lower sides, D E, also the upper ones, G H, are mortised at F and grooved at Q. The ends of the shell, also made in lower and upper sections, I J, have their edges R fitted in the grooves Q, and also have tenons K projecting through said mortises and secured by keys L, which extend through the upper and lower tenons of the several end sections, as shown, said tenons being also mortised for the keys.

Besides the gains C in the sills for the front there is a cleat, M, secured to the projecting ends of the sills, for greater security to the front and for a lighting-board.

The sides and ends G, H, and J of the upper part of the shell rest on the top of the sides and ends of the lower part of the shell, and the cover N has side cleats, O, and end cleats, P, for overlapping the sides and ends for making close joints, keeping the cover in position, and for greater security to the sides and ends of the said upper part of the case. The cleats O and P are separated by a space at S for the upper ends of sides G H to enter.

The frames T are arranged side by side in the usual way, being tenoned into the bottom B, and extending upward as high as the top of the lower section of the case. The honey-boxes U are also of usual form and construction; but for their support I propose to dispense with the ordinary frame-pieces extending across the bottom of the upper section of the case, using cleats W, attached to the sides G H, whereon the boxes will rest under the outer ends, and said ends will abut against sides G H, so as to thrust against each other at the top of their inner ends, X, and thus be supported there by each other as an arch. When any boxes are to be taken out or put in the pair of abutting boxes will be taken together.

Y represents a screen-partition, and Z a close partition which I propose to use between the frames for temporarily separating queens from the rest of the bees when it may be desired to introduce them from other hives for any cause.

It will be seen that a hive constructed in this manner may be opened at any time by taking off the top, sides, and ends, without disturbing the frames nor materially disturbing the bees within the spaces between the frames, thus exposing the frames to the view of the keeper to see the condition of the bees at any time, enabling him to handle the bees and frames without crushing the bees or breaking combs or frames, and it facilitates the removal of frames which it is difficult to remove from the top of the hive on account of being waxed fast by the bees.

The arrangement is especially advantageous in the management of the bees for wintering, as it enables the case to be taken off whenever required for wrapping paper or cloth around the frames and the bees for the protection of the latter, the wrapping being placed next to the bees, so that it absorbs the moisture caused by the heat and sweat of the bees, and may be removed and dried from time to time.

The contrivance is also very favorable for the introduction of Italian or other queens by crowding the bees to one end of the hive when part of the case is removed, placing the screen-partition before them, then putting in one or more frames of honey, and then putting in the solid partition between said frames and the entrance to the vacant end of the hive, inclosing the queen in the space thus partitioned where she may remain safely caged for a sufficient time to establish friendly relations with the bees.

Having thus described my invention, I claim as new and desire to secure by Letters Patent—

1. The case of a bee-hive, consisting of the sills A, having gains C for the lower edges of the sides, said sides having grooves Q for the edges R of the ends I J, and also having mortises F for the tenons K, the ends I J having said tenons K, and said tenons being secured by keys L, substantially as described.

2. The improved bee-hive case, constructed in lower and upper sections of detachable parts, substantially as described, and the said detachable parts of the said lower and upper sections, and also said lower and upper sections being connected together by the tenons K and keys L, substantially as described.

3. In a bee-hive, the combination, with the sides G H of the upper section, provided with the cleats W at their lower ends, of the honey-boxes U, the outer ones resting on the cleats W and against the sides G H, and the inner ones resting against the inner ends of the outer ones, substantially as and for the purpose set forth.

GEORGE ELLSWORTH.

Witnesses:
ABEL COMSTOCK,
R. M. ELLSWORTH.